(12) United States Patent
Browne et al.

(10) Patent No.: US 7,514,005 B2
(45) Date of Patent: Apr. 7, 2009

(54) METHOD OF PROCESSING DRILLING FLUID

(75) Inventors: Neale Browne, Houston, TX (US); Catalin Ivan, Sugar Land, TX (US)

(73) Assignee: M-I L.L.C., Houston, TX (US)

( * ) Notice: Subject to any disclaimer, the term of this patent is extended or adjusted under 35 U.S.C. 154(b) by 308 days.

(21) Appl. No.: 11/340,034

(22) Filed: Jan. 26, 2006

(65) Prior Publication Data

US 2007/0170118 A1 Jul. 26, 2007

(51) Int. Cl.
*B01D 17/04* (2006.01)

(52) U.S. Cl. .................. 210/708; 175/66; 175/206; 210/689; 210/710; 210/737; 210/738; 210/770

(58) Field of Classification Search ............ 175/66
See application file for complete search history.

(56) References Cited

U.S. PATENT DOCUMENTS

| | | | | |
|---|---|---|---|---|
| 3,777,405 A | * | 12/1973 | Crawford | |
| 4,013,233 A | * | 3/1977 | Nylund | |
| 4,411,074 A | * | 10/1983 | Daly | |
| 4,480,702 A | * | 11/1984 | Kelly, Jr. | |
| 4,626,360 A | | 12/1986 | Senyard et al. | |
| 4,645,608 A | * | 2/1987 | Rayborn | |
| 4,649,655 A | * | 3/1987 | Witten | 34/135 |
| 4,998,678 A | * | 3/1991 | Durr | |
| 5,195,847 A | * | 3/1993 | Guymon | |
| 5,199,997 A | * | 4/1993 | Stowe | 134/25.1 |
| 5,286,386 A | | 2/1994 | Darian et al. | |
| 5,570,749 A | * | 11/1996 | Reed | |
| 6,132,630 A | | 10/2000 | Briant et al. | |
| 6,214,236 B1 | * | 4/2001 | Scalliet | |
| 6,745,856 B2 | * | 6/2004 | Simpson et al. | |
| 6,796,379 B1 | * | 9/2004 | Martin | |
| 6,988,567 B2 | * | 1/2006 | Burnett et al. | |
| 6,997,599 B2 | * | 2/2006 | Gallup | 366/176.1 |
| 7,025,153 B2 | * | 4/2006 | Boutte et al. | |

OTHER PUBLICATIONS

International Search Report and Written Opinion, mailed Jun. 15, 2007, for International Application PCT/US2007/061038 filed Jan. 25, 2007.

* cited by examiner

*Primary Examiner*—Peter A Hruskoci

(57) ABSTRACT

A method for processing drilling fluid comprising an oil and water emulsion and solid material includes breaking the emulsion into an oil phase and a water phase, increasing the surface area of the solid material, adsorbing at least some of the water phase to the increased surface area of the solid material, and recovering at least some of the oil phase. The drilling fluid may be moved within a container to break the emulsion and increase the surface area of the solids material. Water phase or solid material may be added to the drilling fluid to maximize the amount of water phase adsorbed into the solid material and minimize the amount of oil phase adsorbed to the solid material. The drilling fluid may be processed while being transported between locations. The solid material may be dried in a thermal dryer to vaporize and recover the water phase and any adsorbed oil phase.

15 Claims, 3 Drawing Sheets

METHOD OF PROCESSING DRILLING FLUID

BACKGROUND OF INVENTION

The present invention relates to the drilling of oil and gas well. More particularly, the present invention relates to the processing of drilling fluid, such as drilling waste.

In the drilling of oil and gas wells, a drill bit is used to dig many thousands of feet into the earth's crust. Oil rigs typically employ a derrick that extends above the well drilling platform and that supports joint after joint of drill pipe connected end to end during the drilling operation. The drill pipe or "drill string" thus comprises a plurality of joints of pipe, each of which has an internal, longitudinally extending bore. The drill string bore carries drilling fluid, or "drilling mud", from the well drilling platform through the drill string and to a drill bit supported at the lower, or distal, end of the drill string.

Drilling fluids can be any fluids and mixtures of fluids and solids, such as solid suspensions, mixtures, and emulsions of liquids, gases, and solids, used in operations to drill boreholes into the earth. Most drilling fluids are emulsions, which are a dispersion of one immiscible liquid into another. Chemicals such as emulsifiers can also be used to reduce the interfacial tension between the two liquids to achieve stability.

Two emulsion types are commonly used as drilling fluids. The first is oil-in-water, or direct, emulsion, known as "emulsion mud". Emulsion muds are thus water-base drilling fluids that contain a dispersed oil or synthetic hydrocarbon as an internal phase. The second is water-in-oil, or invert, emulsion, known as an "invert emulsion mud". Invert emulsion muds are thus oil-base muds that contain water as an internal phase.

The drilling fluid lubricates the drill bit and carries away small pieces of rock, or "drill cuttings", such as shale generated by the drill bit as it digs deeper. The cuttings are carried in a return flow stream of drilling fluid through the well annulus and back to the well drilling platform at the earth's surface.

The drill cuttings are then separated from the reusable drilling fluid with commercially available separators known as "shale shakers". Shale shakers operate by vibrating a wire-cloth screen while the drilling fluid flows on top of it. The liquid phase of the drilling fluid and solids smaller than the wire mesh pass through the screen, while larger solids are retained on the screen and eventually fall off the back of the device. Obviously, smaller openings in the screen clean more solids from the whole mud, but there is a corresponding decrease in flow rate per unit area of wire cloth. Some shale shakers are designed to filter coarse material from the drilling fluid while other shale shakers are designed to remove finer particles. Despite the use of shakers, a certain amount of drilling mud, which can contain hazardous oil, adheres to the drill cuttings. Other solids separators include mud cleaners and centrifuges that remove fine and ultrafine solids. Centrifuges comprise a rotating conical drum. Drilling fluid is fed into one end of the centrifuge and the separated solids are moved up the drum by a rotating scroll and exit at the other end.

After solids separation, the drill cuttings are disposed as drilling waste and the reusable drilling fluid is returned to a mud pit where it can be recycled into the well bore. In addition, over time the post-separation drilling fluid becomes too contaminated with fine solids particles that cannot be removed through typical separation techniques. Once the drilling fluid is no longer recyclable, it also becomes drilling waste and must be disposed.

After being run through the solids separators, the drilling waste comprising the drill cuttings and any residual drilling fluid is placed into holding containers. The drilling waste may also include the "recovered" drilling fluid that is no longer reusable in the well. The containers are then loaded onto either a truck or a boat for transportation to the processing facility. The drilling waste is then removed from the containers by washing the drilling waste out of the containers with large amounts of water.

Once emptied from the containers at the processing facility, the drilling waste is then processed using a thermal dryer. A thermal dryer typically consists of a sealed enclosure containing a rotating auger or other transferring means for moving the drilling waste through the enclosure. In the enclosure, the drilling waste is heated either directly or indirectly to evaporate any oil and water. The oil and water vapor are then recovered through condensation and are drawn off as liquids. The residual cleaned solid material is then pushed out of the dryer for bagging and disposal.

SUMMARY

One embodiment of the method of processing a drilling fluid that comprises an oil and water emulsion and solid material includes breaking the oil and water emulsion, increasing the surface area of the solid material, adsorbing at least some of the water phase to the increased surface area of the solid material, and recovering at least some of the oil phase. The method may include moving the drilling fluid in a container to break the emulsion and increase the surface area of the solid material.

One embodiment of the method for processing drilling fluid that comprises an oil and water emulsion and solid material may further include adjusting the ratio of solids material to water phase to maximize the amount of water phase adsorbed into the solids material while minimizing the amount of the oil phase adsorbed to the solid material. The embodiment may include adding solid material or water phase to the drilling fluid.

One embodiment of the method includes processing the drilling fluid as the drilling waste is being transported from one location to another. For example, the drilling waste may be moved during transportation on a boat or a motor vehicle.

One embodiment of the method includes drying the solid material and adsorbed water phase as well as any adsorbed oil phase with a thermal dryer and recovering the water and any oil phase in the form of vapors.

Thus, the embodiments comprise a combination of features and advantages that overcome the problems of prior art devices. The various characteristics described above, as well as other features, will be readily apparent to those skilled in the art upon reading the following detailed description of the embodiments, and by referring to the accompanying drawings.

BRIEF DESCRIPTION OF THE DRAWINGS

For a more detailed description of the embodiments, reference will now be made to the following accompanying drawings.

DETAILED DESCRIPTION OF THE EMBODIMENTS

Figure 1:
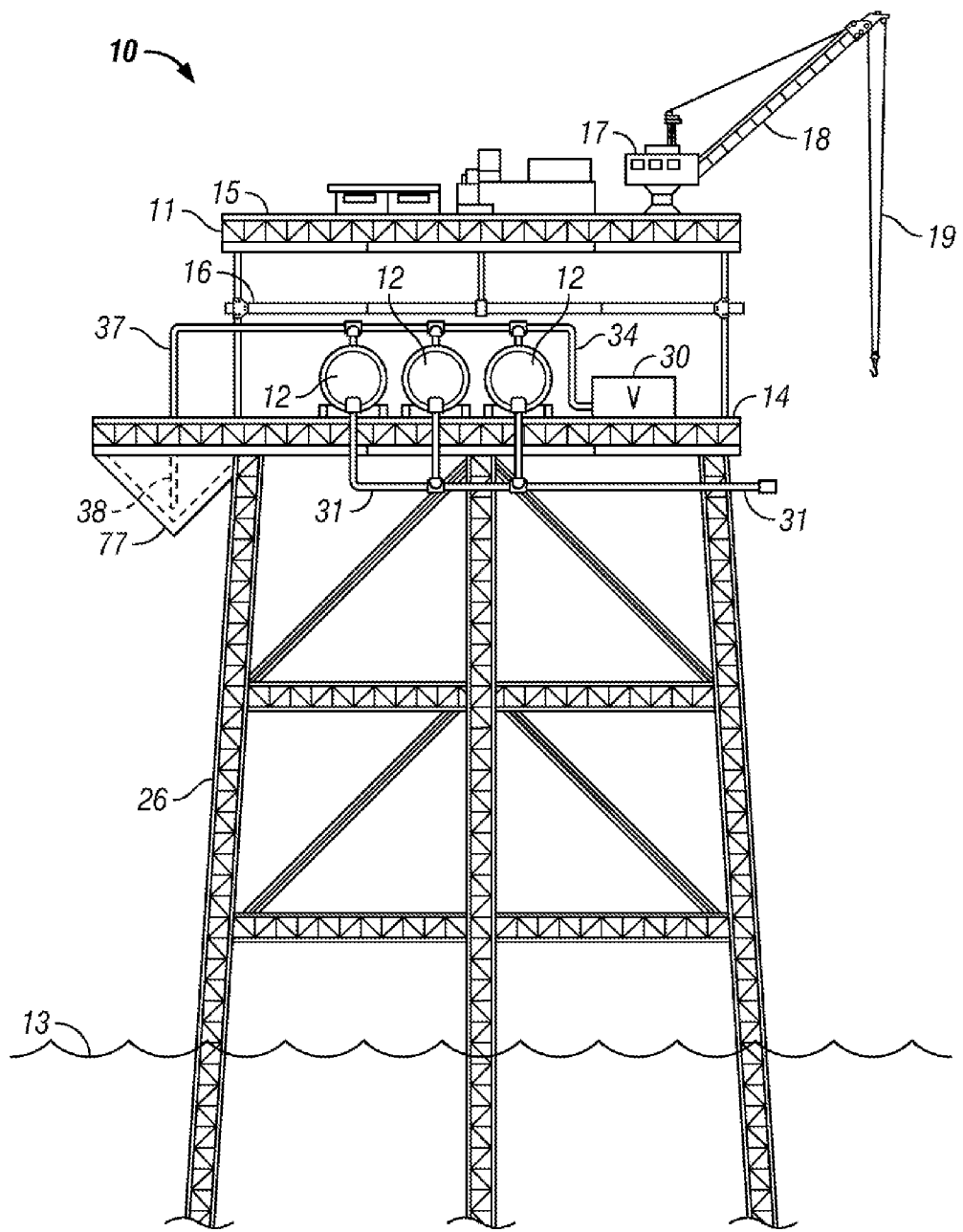
FIG. 1 is an elevation view of a drilling waste container on a drilling rig.

The present invention relates to processing drilling fluid and includes embodiments of different forms. The drawings and the description below disclose specific embodiments of the present invention with the understanding that the embodiments are to be considered an exemplification of the principles of the invention, and are not intended to limit the invention to that illustrated and described. Further, it is to be fully recognized that the different teachings of the embodiments discussed below may be employed separately or in any suitable combination to produce desired results.

One embodiment of the method comprises processing drilling fluid comprising an oil and water emulsion and water-wet solid material in a container. The drilling fluid may also comprise other fluids, solids, or other substances. The drilling fluid may include any combination of drilling fluid, oil, water, solid material, or other substances. Additionally, the drilling fluid may be drilling waste including material directly from the well or material that has been processed through a solids separator. Thus, there are different possible combinations of amounts of oil, water, and solid material in the drilling fluid. The fluid may also be processed at any location, including at the drilling site or at a processing facility.

The drilling fluid is processes by breaking the oil and water emulsion into a "free" water phase and a "free" oil phase. The process of breaking the emulsion begins with flocculation where the oil particles begin to attach and form an aggregate mass of oil and the water particles begin to attach and form an aggregate mass of water. Flocculation is followed by coalescence, which is the process of droplet growth as small drops merge together when they come in contact. If coalescence continues to occur, a continuous oil phase and a continuous water phase form and the emulsion is thus broken. Although, when broken, the oil phase and the water phase are separate, there may still be some water particles in the oil phase and some oil particles in the water phase. Thus the oil phase need not be pure oil and the water phase need not be pure water for the emulsion to have been broken. The emulsion can be broken by any suitable means, such as mechanically by moving the drilling fluid The embodiment further comprises increasing the surface area of the water-wet solid material. One quality of solids is their wettability, or preference to contact one liquid, known as the wetting phase, rather than another. The wetting phase tends to spread on the solid surface and adsorb to the solid, displacing the non-wetting phase. Water-wet describes solids with a preference to be in contact with a water phase rather than an oil phase. Water-wet solids thus preferentially adsorb water. The surface area of the solid material may be increased by any suitable means. For example, the solid material may be moved such that it is broken up and formed into small pieces, such as balls or generally spherical pellets. The solid material may be moved in the container by any means and in any suitable fashion. As non-limiting examples, the solid material may be tumbled, shaken, vibrated, and/or stirred. The solid material may also be moved in the container continuously or intermittently or at a constant rate or varying rates. Additionally, the container may be maintained air-tight or left open to the atmosphere. The solid material may also be any suitable water-wet material, such as drill cuttings or bentonite.

The embodiment further comprises adsorbing at least some of the free water phase to the increased surface area of the solid material. Because the solid material is water-wet, the water phase is preferentially adsorbed to the new surface area before the oil phase. Therefore, at least some, and possibly all, of the water phase is adsorbed to the surface area of the solid material. The amount of the water phase adsorbed to the solid material depends on the amount of surface area of the solid material available for adsorption.

The embodiment further comprises recovering at least some of the oil phase. With at least some of the water phase adsorbed to the solid material, the oil phase and any remaining water phase are left free in the container separate from the solid material with the adsorbed water phase. The oil phase may be recovered by any suitable means. For example, the entire contents of the container may be run through a solids separator such as a shale shaker to separate the oil phase and any remaining water phase from the solid material with adsorbed water. The separated oil phase and any remaining water phase may then be separated from each other using a centrifuge or thermal drier.

Figure 2:
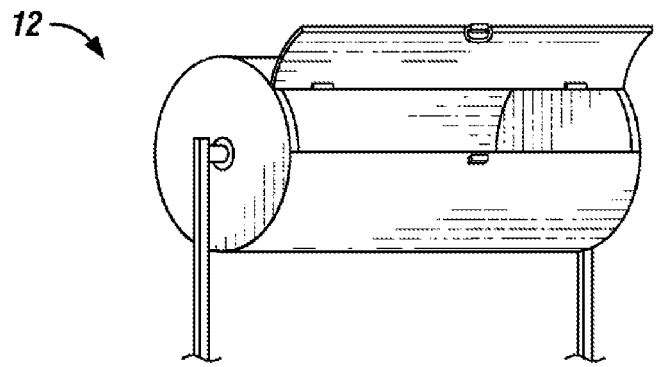
FIG. 2 is a perspective view of the drilling waste container.

As an example of the first embodiment, FIGS. 1 and 2 show drilling waste containers 12 on a drilling rig 10. The drilling rig 10 may also be a workover rig or any other type of production facility for a well. The drilling rig 10 includes an offshore oil and gas well drilling platform 11. The platform 11 can include a lower support structure or jacket 26 that extends to the ocean floor and a short distance above the water surface 13. The platform 11 can also be a jack-up rig, a semi-submersible, a production barge, or a drilling barge. A superstructure is mounted upon the jacket 26. The superstructure includes a number of spaced apart decks including lower deck 14, upper deck 15, and an intermediate deck 16. Such a platform 11 typically includes a lifting device such as crane 17 having boom 18 and lifting line 19. The drilling rig 10 includes one or more tanks 12 for holding drilling waste and other materials that have been removed from the well during drilling. In general, the concept of an offshore well platform is well known in the art and no particular configuration of the rig platform or its equipment is required.

During well operations, a receptacle on rig 11 such as trough 77 receives drilling waste comprising drilling fluid and drill cuttings from the well. Material in trough 77 is then moved to one or more of the containers 12 using a vacuum unit 30 connected to suction manifold 34 via a suction line. An additional suction manifold 37 communicates with each of the containers 12 and with trough 77 via suction intake 38. In this fashion, valving enables drilling waste to be transmitted to any selected container 12. In addition, other transfer equipment, such as pumps, pneumatic transfer systems, and mechanical transfer systems such as screw conveyors may be used to transfer the drilling waste instead of vacuums.

The containers 12, for example, may be commercial cement mixers with an eight cubic meter capacity. As an example, approximately five cubic meters of oil based drilling fluid cuttings are inserted into one of the containers 12 through any suitable means. The drilling fluid comprises approximately 58% drill cuttings, and 42% oil based drilling fluid emulsion made up of 16% oil and 26% water. The containers 12 may be of any suitable size capacity; e.g., of a volume of between 100 and 1000 barrels. Once the drilling waste is in the containers 12, the containers 12 rotate to tumble the drilling waste inside. For example, the containers 12 rotate at approximately one revolution per minute for twenty-one hours. The containers 12 may be rotated by any suitable means, such as by mechanical or electrical motors with gear and/or belt drives. At the end of a predetermined period of time, the materials are emptied from the container 12 and run through a solids separator to separate the drill cuttings and adsorbed liquids from the free liquids. In this example, at the end of the twenty one hours, the drill cuttings adsorb all of the water phase and even some of the oil phase. The separated drill cuttings comprise approximately 73% drill cuttings, 9% oil, and 18% water. The free liquid comprises approximately 98% oil and 2% drill cuttings. Thus, the recovered oil is 98% pure oil. At the end of the twenty-one hours, the solid material and adsorbed fluids have also been formed into small balls. The above example is not intended to be limiting in any way, but is merely offered for illustrative purposes.

A second embodiment of the method of processing drilling fluid involves consideration of the amount of oil, water, and solid material being processed. As noted above, the amount of the water phase adsorbed to the solid material depends on the amount of surface area of the solid material available for adsorption. Thus, the ratio of the amount of solid material surface area to the amount of water phase affects how much of the oil phase is recovered. In the second embodiment, the ratio of solid material to water phase is adjusted to maximize the amount of the water phase adsorbed to the solid material while minimizing the amount of oil phase adsorbed to the solid material. The ratio may be adjusted by either adding additional solid material to the drilling fluid or adding more water phase to the drilling fluid. The additional solid material may be any suitable water-wet solid material, such as drill cuttings or bentonite. The additional solid material and/or additional water phase may be added by any suitable means. Once the ratio of solid material to water phase has been adjusted, the remainder of the second embodiment is performed in a similar manner as the first embodiment.

As a first example of the second embodiment, the drilling fluid may initially comprise 35% oil phase, 45% water phase, and 10% solid phase. Thus, the ratio of solid material to water phase is too low and not all of the water phase would be adsorbed to the solid material because of the lack of sufficient available solid material surface area. To increase the amount of water phase adsorbed, more solid material, such as bentonite, is added to the drilling fluid. How much additional solid material added depends on the total amount of water phase to be adsorbed. Increasing the ratio of solid material to water phase increases the amount of available water-wet solid material surface area, thus increasing amount of water phase adsorbed. However, if more solid material is added than needed to adsorb the water phase, the excess solid material, although water-wet, will adsorb the oil phase. Therefore, no more solid material than is necessary to adsorb the maximum amount of water phase is added. For this example, 150 lbs. of bentonite was added and 40% of the water phase was adsorbed.

As a second example of the second embodiment, the drilling fluid may initially comprise 30% oil phase, 35% water phase, and 35% solid phase. Thus, the ratio of solid material to water phase is too high and, in addition to all of the water phase adsorbing to the solid material, some of the oil phase would adsorb as well. To decrease the amount of oil phase adsorbed, an additional amount of water phase is added to the drilling fluid. How much additional water phase is added depends on the total amount of available water-wet solid material surface area. Decreasing the ratio of solid material to water phase, decreases the amount of oil phase that would have been adsorbed to the solid material. However, no more water phase than is necessary to minimize the amount of oil phase adsorbed to the solid material is added. For this example, 75 gallons of water phase was added and 30% of the water phase was adsorbed, leaving 115 gallons of oil phase free from the solid material.

A third embodiment of the method of processing drilling fluid comprises processing the drilling fluid during the transportation of the drilling waste from one location to another. The third embodiment may be performed in a manner similar to either of the first two embodiments, with the exception that the processing takes place during transportation.

Figure 3:
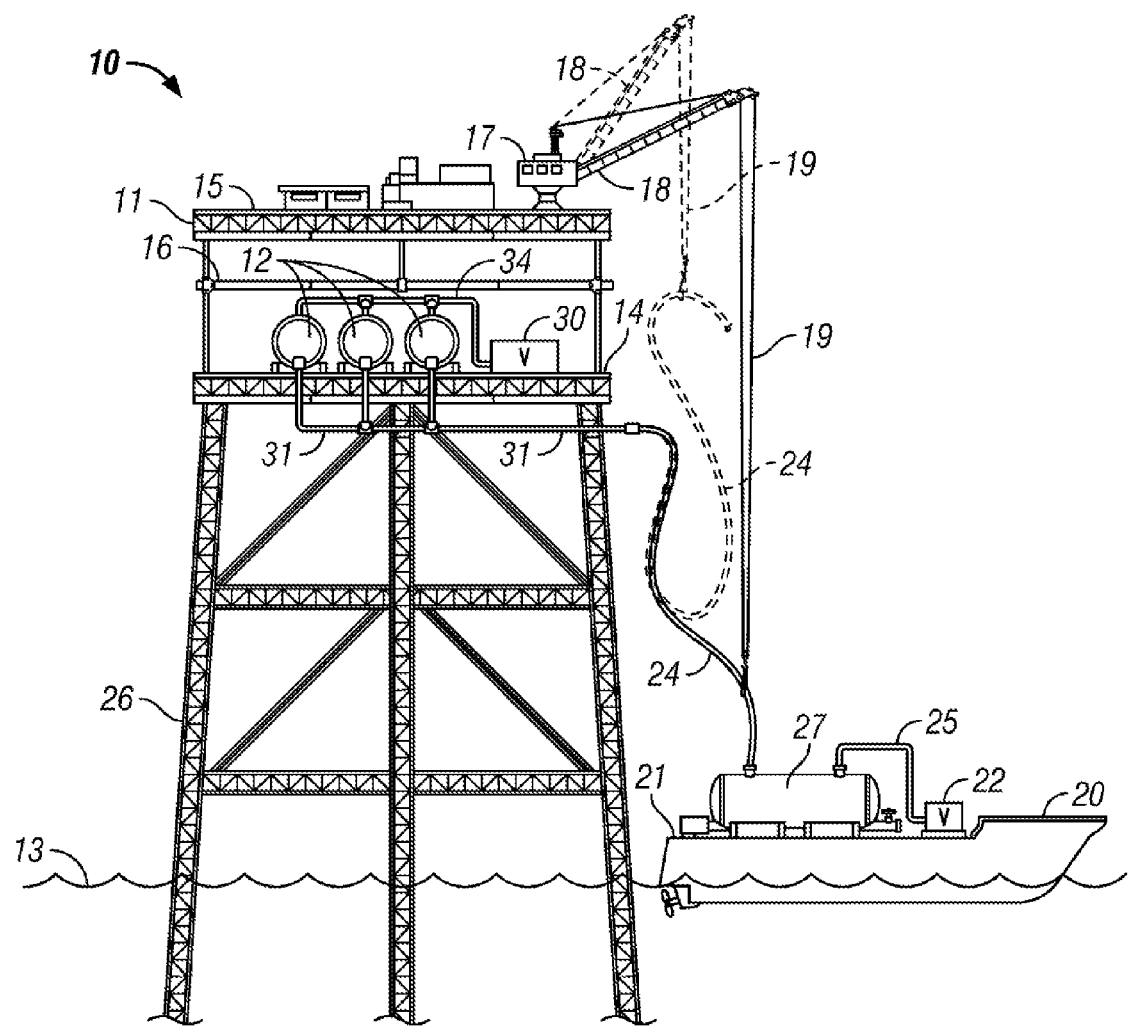
FIG. 3 is an elevation view of a drilling waste container on a boat.

As an example, FIG. 3 shows a floating vessel 20 next to a rig 10 with a deck 21 that supports vacuum unit 22, vacuum lines 25, and one or more containers 27. However, no exact configuration of the equipment on vessel 20 is required. For example, other transfer equipment, such as pumps, pneumatic transfer systems, and mechanical transfer systems such as screw conveyors may be included on the vessel 20 to transfer the drilling fluid instead of vacuums.

With the vessel 20 next to the rig 10, rig flowline 24 connects to the container 27 that is connected to vessel vacuum unit 22. The vacuum unit 22 then suctions the drilling waste from the rig 10 to the container 27 via vacuum lines 24 and 25. Once the transfer of the drilling waste is complete, the rig flowline 24 is disconnected from the container 27 and the vessel 20 then transports the drilling waste to a disposal site, such as an injection well. However, the disposal site may be a location other than an injection well, such as, for example, an on-shore disposal facility. During the transportation of the drilling waste on the boat 20, the container 27 may be rotated or moved in any sufficient manner so as to break the emulsion of the drilling fluid and increase the surface area of the drill cuttings. The process is thus performed in a similar manner as described above in either the first or second embodiments.

Figure 4:
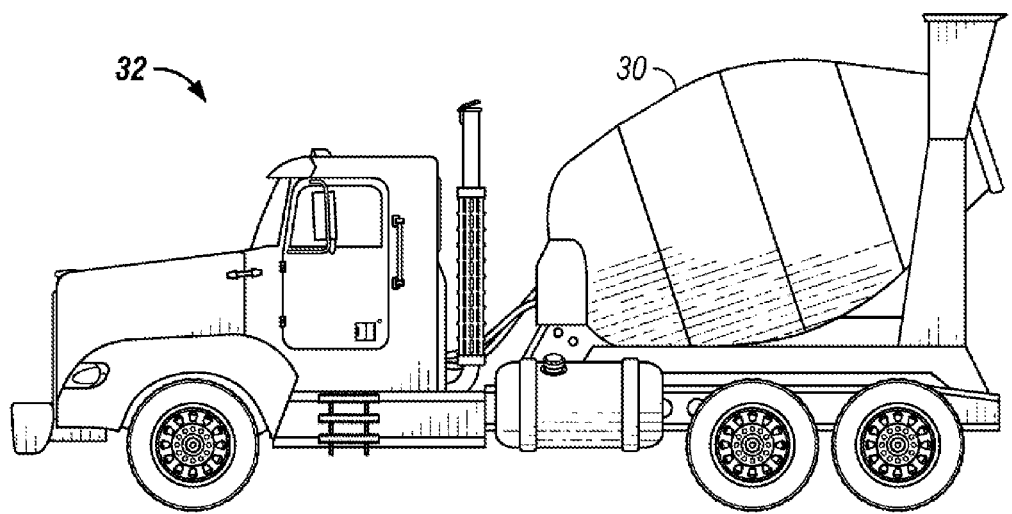
FIG. 4 is an elevation view of a drilling waste container on a motor vehicle.

The third embodiment may be performed during transportation from an on-shore drilling rig. As an example, FIG. 4 shows a container 30 on a truck 32 for transporting the drilling waste from an on-shore drilling rig to an on-shore processing facility or some other location. The drilling waste is transferred from the on-shore drilling rig to the container 30 by any suitable means, such as using flowlines with a pump or blower. Once the transfer is complete, the flowline is disconnected from the container 30 and the truck 30 then transports the drilling waste to a disposal site, such as, for example, an on-shore disposal facility. During the transportation of the drilling waste, the container 30 may be rotated or moved in any sufficient manner so as to break the emulsion of the drilling fluid and increase the surface area of the drill cuttings. The process is thus performed in a similar manner as described above in either the first or second embodiments.

Figure 5:
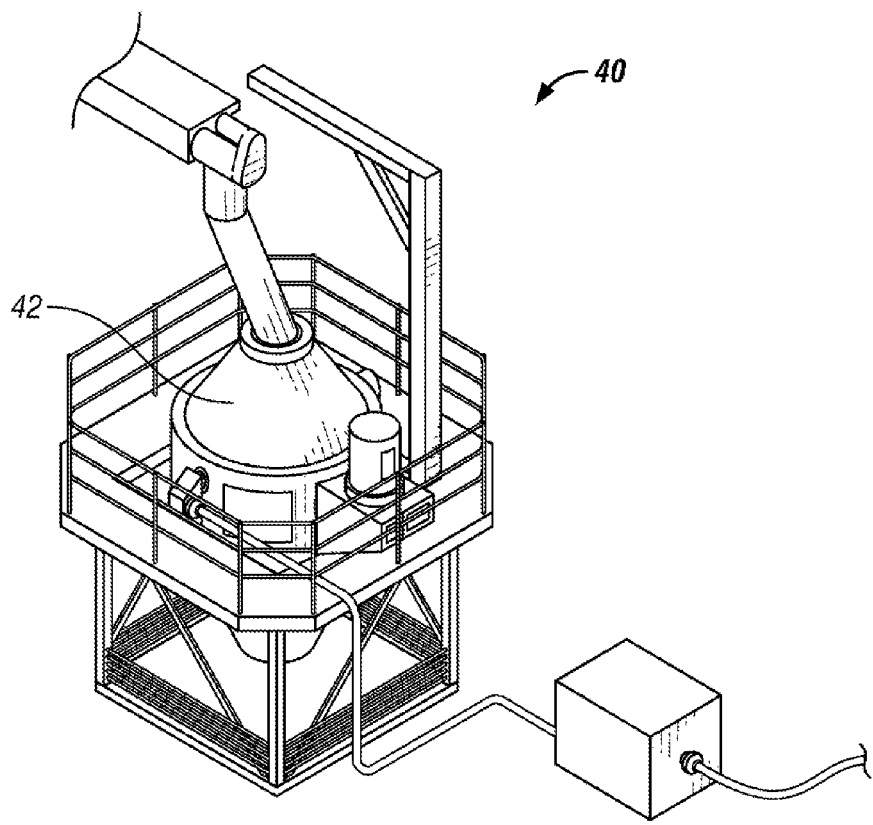
FIG. 5 is a perspective view of a thermal dryer.

Referring to FIG. 5, a fourth embodiment of the invention further comprises processing the solid material and adsorbed water phase and adsorbed oil phase, if any, with a thermal dryer 40. After free oil phase is separated from the solid material, the solid material and any adsorbed water and/or oil phase is run through a thermal dryer 40 at a processing facility. The solid material is inserted into a sealed enclosure 42. Once in the enclosure 42, the solid material is moved through the enclosure 42 by a rotating auger or other transferring means. In the enclosure 42, the solid material is heated either directly or indirectly to evaporate the water phase and any oil phase. The water vapor and any oil vapor are then recovered through condensation and are drawn off as liquids. The cleaned solid material is then pushed out of the dryer for bagging and disposal.

While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

What is claimed is:

1. A method of processing drilling fluid comprising an oil and water emulsion and a solid material, the method comprising;
   tumbling the drilling fluid in a container by rotating the container to mechanically break the emulsion into an oil phase and a water phase;
   increasing the surface area of the solid material by tumbling the drilling fluid in the container to form the solid material into generally spherical pellets;
   adsorbing at least some of the water phase to the increased surface area of the solid material; and
   recovering at least some of the oil phase.

2. The method of claim 1 further comprising transporting the container.

3. The method of claim 1 further comprising adding additional solid material.

4. The method of claim 3 wherein the additional solid material comprises drill cuttings.

5. The method of claim 3 wherein the additional solid material comprises clay.

6. The method of claim 5 wherein the clay comprises bentonite.

7. The method of claim 1 further comprising adding water to the drilling fluid.

8. The method of claim 1 further comprising evaporating at least some of the water phase.

9. The method of claim 8 wherein evaporating at least some of the water phase comprises opening the drilling fluid to the atmosphere.

10. The method of claim 9 wherein evaporating at least some of the water phase further comprises heating the drilling fluid.

11. The method of claim 1 further comprising adding a surfactant to increase the adsorption rate of the water phase to the solid material.

12. The method of claim 11 further comprising adding a detergent to increase the adsorption rate of the water phase to the solid material.

13. The method of claim 1 further comprising drying the solid material in a thermal dryer.

14. The method of claim 1 wherein substantially all of the water phase is adsorbed to the increased surface area of the solid material and substantially all of the oil phase is recovered.

15. A method of processing drilling fluid comprising an oil and water emulsion and a solid material, the method comprising:
   tumbling the drilling fluid in a container by rotating the container to mechanically break the emulsion into an oil phase and a water phase;
   increasing the surface area of the solid material by tumbling the drilling fluid in the container to form the solid material into generally spherical pellets, the solid material having a higher water affinity than oil affinity;
   adsorbing substantially all of the water phase to the increased surface area of the solid material; and
   recovering substantially all of the oil phase.

* * * * *